US008725148B2

(12) United States Patent
George et al.

(10) Patent No.: US 8,725,148 B2
(45) Date of Patent: May 13, 2014

(54) SYSTEM AND METHOD FOR HANDOFF OF SESSION FROM VOIP INTERFACE TO CELLULAR INTERFACE OF DUAL-MODE DEVICE

(75) Inventors: Richard George, Waterloo (CA); Alexander Shatsky, Waterloo (CA)

(73) Assignee: Blackberry Limited, Waterloo (CA)

( * ) Notice: Subject to any disclaimer, the term of this patent is extended or adjusted under 35 U.S.C. 154(b) by 1116 days.

(21) Appl. No.: 12/038,947

(22) Filed: Feb. 28, 2008

(65) Prior Publication Data
US 2009/0023450 A1    Jan. 22, 2009

Related U.S. Application Data

(60) Provisional application No. 60/949,898, filed on Jul. 16, 2007.

(51) Int. Cl.
*H04W 36/00* (2009.01)
(52) U.S. Cl.
USPC ................... 455/436; 455/552.1; 370/331
(58) Field of Classification Search
USPC ............... 455/436–444, 552.1, 553.1, 550.1; 370/331–333
See application file for complete search history.

(56) References Cited

U.S. PATENT DOCUMENTS

| 8,331,340 | B2 * | 12/2012 | Lazaridis et al. | ............. 370/338 |
| 8,583,107 | B2 * | 11/2013 | Chintada et al. | ........... 455/432.1 |
| 8,588,174 | B2 * | 11/2013 | Shatsky | ........................ 370/331 |
| 2005/0141456 | A1 * | 6/2005 | Shaheen | ........................ 370/331 |
| 2005/0147049 | A1 | 7/2005 | Ganesan | |
| 2006/0025141 | A1 | 2/2006 | Marsh et al. | |
| 2006/0077957 | A1 | 4/2006 | Reddy | |
| 2006/0116127 | A1 | 6/2006 | Wilhoite | |
| 2006/0205436 | A1 | 9/2006 | Liu et al. | |
| 2006/0229101 | A1 | 10/2006 | LaBauve et al. | |
| 2006/0246903 | A1 | 11/2006 | Kong et al. | |
| 2006/0270447 | A1 * | 11/2006 | Everson et al. | ............. 455/552.1 |
| 2007/0008928 | A1 | 1/2007 | Kezys | |
| 2007/0070948 | A1 * | 3/2007 | Kezys et al. | ................... 370/331 |
| 2007/0076696 | A1 * | 4/2007 | An et al. | ........................ 370/352 |
| 2007/0189220 | A1 * | 8/2007 | Oberle et al. | .................. 370/331 |
| 2007/0265003 | A1 | 11/2007 | Kezys et al. | |
| 2007/0268858 | A1 | 11/2007 | Soto | |

FOREIGN PATENT DOCUMENTS

| EP | 1737188 | 12/2006 |
| WO | WO2006/076694 | 7/2006 |
| WO | WO2006/127255 | 11/2006 |

OTHER PUBLICATIONS

Mahy, et al., "A Call Control and Multi-Party Usage Framework for the Session Initiation Protocol (SIP)", (work in progress) draft-ietf-sipping-cc-framework-07, Mar. 4, 2007.
Sparks, R., "The Session Intitiation Protocol (SIP) Refer Method", RFC3515, Apr. 2003.

(Continued)

*Primary Examiner* — Steven Kelley
(74) *Attorney, Agent, or Firm* — Ridout & Maybee LLP

(57) ABSTRACT

A method and system for handing off an active VoIP call with a remote party from a VoIP interface of a dual-mode device to a cellular interface of the dual-mode device. A cellular call is established between a PBX IP/PSTN gateway and the cellular interface. Media relating to the first termination point of the VoIP leg of the active call is then redirected to the cellular call and the VoIP leg is terminated.

27 Claims, 9 Drawing Sheets

(56) References Cited

OTHER PUBLICATIONS

Mahy, R., Network Working Group, "The Session Initiation Protocol (SIP) "Replaces" Header", Sep. 2004.
Sparks, R., Sipping WG, "Session Initiation Protocol Call Control—Transfer Draft—IETF-Sipping-CC-Transfer-08", Jul. 16, 2007.
Rosenberg, J., SIP Internet-Draft, "Obtaining and Using Globally Routable User Agent (UA) URIs (GRUU) in the Session Initiation Protocol (SIP) Draft-IETF-SIP-GRUU-14", Jun. 25, 2007.
Kyzivat, P., Sipping Internet-Draft, "Registration Event Package Extension for Session Initiation Protocol (SIP) Globally Routable User Agent URIs (GRUUs) Draft-IETF-Sipping-GRUU-Reg-Event-09", Jan. 7, 2008.
Johnston, A., Network Working Group, "Session Initiation Protocol (SIP) Call Control—Conferencing for User Agents", Aug. 2006.
Willis, D., Network Working Group, "Session Initiation Protocol (SIP) Extension Header Field for Registering Non-Adjacent Contracts", Dec. 2002.
Johnston, Ed. A., Sipping Working Group, "Session Initiation Protocol Service Examples Draft-IETF-Sipping-Service-Examples-13", Jan. 17, 2008.
Office Action dated Jun. 24, 2011 for corresponding European Patent Application No. 08714710.4.
Extended European Search Report dated Nov. 8, 2010.
Office Action dated Nov. 8, 2012 for corresponding Canadian Patent Application No. 2,692,944.

\* cited by examiner

SYSTEM AND METHOD FOR HANDOFF OF SESSION FROM VOIP INTERFACE TO CELLULAR INTERFACE OF DUAL-MODE DEVICE

FIELD

The present application relates to dual-mode devices having both a cellular interface and a Voice-over-IP (VoIP) interface and, in particular, a system and method for switching an active session, for instance, a voice call, from the VoIP interface to the cellular interface.

BACKGROUND

Many enterprises are moving towards using VoIP over their LANs and WLANs to interconnect various terminal devices for voice communications. Moreover, external voice communications with remote parties through, for example, the PSTN, may be converted to VoIP communications for routing within the enterprise communication system. A Private Branch exchange (PBX) typically acts as the interface between the PSTN and the internal enterprise communication system. The PBX provides conversion between digital circuit-switched calls and VoIP calls, and assists in routing calls to the correct terminal device. SIP signaling is commonly used to set-up, manage, and tear-down media paths for the VoIP calls.

Conventional mobile devices are configured for cellular wireless communications. Cellular communication may take place using any one of a number of cellular protocols, including GSM, CDMA, etc. Now, many mobile devices are configured for both cellular communications and IP communications. These are referred to a "dual-mode" devices.

Dual-mode devices may include, for example, handheld mobile devices, but can also include other devices configured for both cellular and IP communications. For example a "softphone" implemented on a laptop with WiFi connectivity may be a dual-mode device.

VoIP calls are often preferred over cellular calls when a device is within IP network coverage limits (e.g. on a WLAN campus), since the WLAN owner/enterprise may charge little or nothing for the VoIP call, and the enterprise, if any, can often provide enhanced services and maintain better control over the session. Nevertheless, cellular typically offers much more extensive coverage than the limited range associated with a WLAN installation. Accordingly, a need may arise to switch an active VoIP call to a cellular network.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
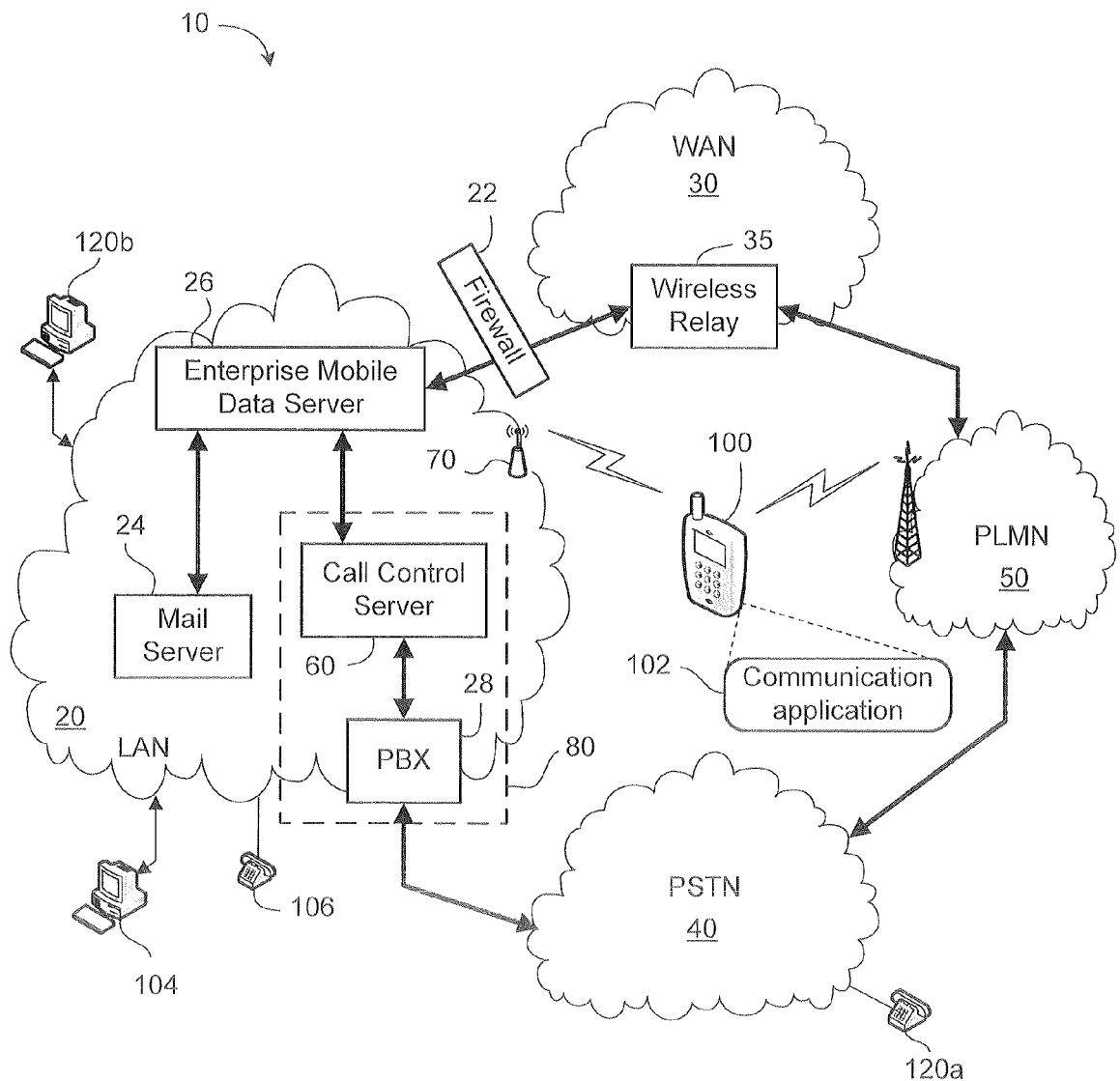
FIG. 1 shows, in block diagram form, an example enterprise communications system.

In one aspect, the present application provides a method of handing off an active call between a Voice-over-IP (VoIP) interface and a cellular interface of a dual-mode device. The active call is with a remote party. The dual-mode device includes the VoIP interface for wireless communications over an IP network and the cellular interface for wireless communications over a public land mobile network (PLMN). The IP network includes a communications server and the active call includes a VoIP leg from the dual-mode device to a first termination point. The method includes the steps of receiving, at the communications server, a handoff instruction message from the VoIP interface of the dual-mode device; initiating a cellular call from the communications server to the cellular interface of the dual-mode device via the PLMN; sending a ringing message from the communications server to the VoIP interface of the dual-mode device; receiving an accepted message via the PLMN with regard to the cellular call confirming connection of the cellular call with the cellular interface of the dual-mode device; sending a message to the first termination point with regard to the active call containing instructions to connect to the cellular call; and terminating the VoIP leg.

In another aspect, the present application provides a communications server for managing a handoff of an active call between a VoIP interface and a cellular interface of a dual-mode device. The active call is with a remote party. The dual-mode device includes the VoIP interface for wireless communications over an IP network and the cellular interface for wireless communications over a public land mobile network (PLMN). The active call includes a VoIP leg from the dual-mode device to a first termination point. The communications server includes a call processing module configured to receive a handoff instruction message from the VoIP interface of the dual-mode device and a PSTN interface configured to initiate a cellular call from the communications server to the cellular interface of the dual-mode device via the PLMN. The call processing module is configured to send a ringing message to the VoIP interface of the dual-mode device. The PSTN interface is configured to receive an accepted message via the PLMN with regard to the cellular call confirming connection of the cellular call with the cellular interface of the dual-mode device. The call processing module is further configured to send a message to the first termination point with regard to the active call containing instructions to connect to the cellular call and to terminate the VoIP leg.

In yet another aspect, the present application provides a computer program product comprising a machine-readable medium having encoded thereon computer-executable instructions for handing off an active call between a VoIP interface and a cellular interface of a dual-mode device. The active call is with a remote device. The dual-mode device includes the VoIP interface for wireless communications over an IP network and the cellular interface for wireless communications over a public land mobile network (PLMN). The IP network includes a communications server and the active call includes a VoIP leg from the dual-mode device to a first termination point. The computer-executable instructions include instructions for receiving, at the communications server, a handoff instruction message from the VoIP interface of the dual-mode device; instructions for initiating a cellular call from the communications server to the cellular interface of the dual-mode device via the PLMN; instructions for sending a ringing message from the communications server to the VoIP interface of the dual-mode device; instructions for receiving an accepted message via the PLMN with regard to the cellular call confirming connection of the cellular call with the cellular interface of the dual-mode device; instructions for sending a message to the first termination point with regard to the active call containing instructions to connect to the cellular call; and instructions for terminating the VoIP leg.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language. Some embodiments described herein rely on Session Initiation Protocol (SIP) signaling for the set-up, management, and tear-down of VoIP calls, although it will be appreciated that in some instances other protocols may be used, such as H.323 and/or proprietary protocols. The SIP protocol is defined in documents published by the Internet Engineering Task Force (IETF), including RFC 3261, and others.

Referring now to the drawings, FIG. 1 shows, in block diagram form, an example enterprise communications system 10. The example system 10 includes an enterprise local area network (LAN) 20, which is connected, through a firewall 22, to a wide area network (WAN) 30, such as the Internet. The system 10 may also connect to a public switched telephone network (PSTN) 40, and a public land mobile network (PLMN) 50, which may also be referred to as a wireless wide area network (WWAN).

The enterprise system 10 may include a number of dual-mode mobile devices 100 (only one shown). The dual-mode mobile device 100 is configured for cellular communications over the PLMN 50 and IP communications over the LAN 20. The IP communications may take place through an Ethernet connection, WiFi connection, or other broadband connection capable of supporting IP connectivity with the mobile device 100. In some scenarios, the mobile device 100 and the IP network 20 are owned or operated in common by the enterprise. For example, the mobile device 100 may be provided by the enterprise to one of its employees for use in connection with his or her employment. However, this is not necessarily the case in all embodiments.

The mobile device 100 is configured for wireless communication. In particular, the mobile device 100 includes an appropriate radio transceiver and associated software for communicating with the PLMN 50. The mobile device 100 may be capable of both wireless voice and data communications via the PLMN 50. In various embodiments, the PLMN 50 and mobile device 100 may be configured to operate in compliance with any one or more of a number of cellular wireless protocols, including GSM, GPRS, CDMA, EDGE, UMTS, EvDO, HSPDA, WiMAX, or a variety of others. It will be appreciated that the mobile device 100 may roam within the PLMN 50 and across PLMNs, in known manner, as the user moves.

The LAN 20 typically includes a number of networked servers, computers, and other devices. For example, the LAN 20 may connect one or more desktop or laptop computers 104 (one shown). The connection may be wired or wireless (WLAN) in some embodiments. The LAN 20 may also connect to one or more desktop telephone sets 106 (one shown).

In this example embodiment, the LAN 20 includes one or more mail servers, such as mail server 24, for coordinating the transmission, storage, and receipt of electronic messages for client devices operating within the LAN 20. Typical mail servers include the Microsoft Exchange Server™ and the IBM Lotus Domino™ server. Each user within the enterprise typically has at least one user account within the LAN 20. Associated with each user account is message address information, such as an e-mail address. Messages addressed to a user message address are stored on the LAN 20 in the mail server 24. The messages may be retrieved by the user using a messaging application, such as an e-mail client application. The messaging application may be operating on a user's computer 104 connected to the LAN 20 within the enterprise. In some embodiments, the user may be permitted to access stored messages using a remote computer, for example at another location via the WAN 30 using a VPN connection. Using the messaging application, the user may also compose and send messages addressed to others, within or outside the LAN 20. The messaging application causes the mail server 24 to send a composed message to the addressee, often via the WAN 30.

in this example, the system 10 further includes a wireless relay 35 that serves to route messages received over the PLMN 50 from the mobile device 100 to the corresponding enterprise LAN 20. The wireless relay 35 also routes messages from the enterprise LAN 20 to the mobile device 100 via the PLMN 50. The wireless relay 35 is shown, in this embodiment, located with the WAN 30.

The LAN 20 also includes an enterprise mobile data server 26 in this example embodiment. Together with the wireless relay 35, the enterprise mobile data server 26 functions to redirect or relay incoming e-mail messages addressed to a user's e-mail address within the LAN 20 to the user's mobile device 100 and to relay incoming e-mail messages composed and sent via the mobile device 100 out to the intended recipients within the WAN 30 or elsewhere. The enterprise mobile data server 26 and wireless relay 35 together facilitate "push" e-mail service for the mobile device 100 enabling the user to send and receive e-mail messages using the mobile device 100 as though the user were connected to an e-mail client within the LAN 20 using the user's enterprise-related e-mail address, for example on computer 104.

It will be appreciated that the "push" e-mail service architecture is not necessary to facilitate the VoIP-to-cellular handover protocols described below. In some embodiments the system may not feature an enterprise mobile data server 26 and wireless relay 35. In some embodiments, addressing is by IP and not through e-mail addresses and the mobile device 100 is capable of communicating over the WAN 30 through the PLMN 50 without the presence of a wireless relay 35 and/or enterprise mobile data server 26. Accordingly, it will be understood that the present application is not intended to be limited to the system architecture depicted in FIG. 1.

As is typical in many enterprises, the LAN 20 includes a Private Branch exchange (PBX) 28 having a connection with the PSTN 40 for routing incoming and outgoing voice calls for the enterprise. On one side, the PBX 28 is connected to the PSTN 40, for example, via direct inward dialing (DID) trunks. The PBX 28 may use ISDN signaling protocols for establishing and breaking circuit-switched connections through the PSTN 40 and related signaling and communications. On its other side, the PBX 28 connects to the LAN 20 and, through the LAN 20, to telephone terminal devices, such as conventional desk sets 106, softphones operating on computers 104, etc. Within the enterprise, each individual may have an associated extension number or direct dial phone number. The PBX may be an IP-PBX in some embodiments. In some other embodiments, the PBX may be a TDM-PBX with an IP gateway to enable SIP communications with the PBX. The PBX 28 implements the switching to connect legs and may, in some embodiments, provide the conversion between a circuit-switched call and a VoIP call. In many embodiments, the PBX 28 provides a number of additional functions including automated attendant, interactive voice response, call forwarding, voice mail, etc. It may also implement certain usage restrictions on enterprise users, such as blocking international calls or premium-rate telephone calls.

In the present embodiment, Session Initiation Protocol (SIP) may be used to set-up, manage, and terminate media sessions for voice calls over the LAN.

The LAN 20 may also include one or more wireless access points 70. The wireless access points 70 provide wireless local area network (WLAN) connectivity to mobile devices 100 (or WiFi-enabled computers 104 or telephone sets 106) within the enterprise campus. The wireless access points 70 may be configured in accordance with one of the IEEE 802.11 specifications. The WAN 30 may also include one or more wireless access points which provide wireless local area network (WLAN) connectivity to mobile devices 100 (or WiFi-enabled computers 104 or telephone sets 106) outside of the enterprise campus. Secure protocols, such as VPN, may be used to connect to the enterprise network. The mobile device 100 is equipped with a suitable antenna, RF transceiver, and software for accessing and using the WLAN connectivity of the wireless access point 70, i.e. the mobile device 100 is "Wi-Fi enabled". In this manner the mobile device 100 may establish an IP connection with the LAN 20 enabling relatively fast data communication.

To provide for management of voice calls by enterprise related terminal devices, such as the mobile device 100, the desk telephone set 106, or the computer 104, the LAN 20 includes a call control server 60. The call control server 60 and the PBX 28 together implement the enterprise communications solution to provide VoIP service to the telephone sets 106, softphones on computers 104, and mobile devices 100 of the enterprise. Although they are depicted separately in FIG. 1, in some embodiments the call control server 60 and PBX 28 may be implemented on a common hardware platform. Collectively, the call control server 60 and PBX 28 may be referred to as the enterprise communications server 80. In another embodiment, the call control server 60 and the enterprise mobile data server 26 may be implemented on a common server platform. Other variations will be appreciated by those skilled in the art.

The mobile device 100 includes a communication application 102, which may include a phone application or other voice-based communication application, for placing and/or receiving VoIP calls and cellular calls. The communication application 102 is configured to employ SIP signaling to set-up, manage, and tear down media paths for VoIP calls. In other words, the communication application 102 renders the mobile device 100 a SIP User Agent (UA). In this regard, the communication application 102 is adapted to generate outgoing SIP messages as a SIP User Agent Client (UAC), and to receive and respond to incoming SIP messages as a SIP User Agent Server (UAS). In some embodiments, the call control server 60 may be configured to act as a back-to-back user agent (B2BUA).

Figure 2:
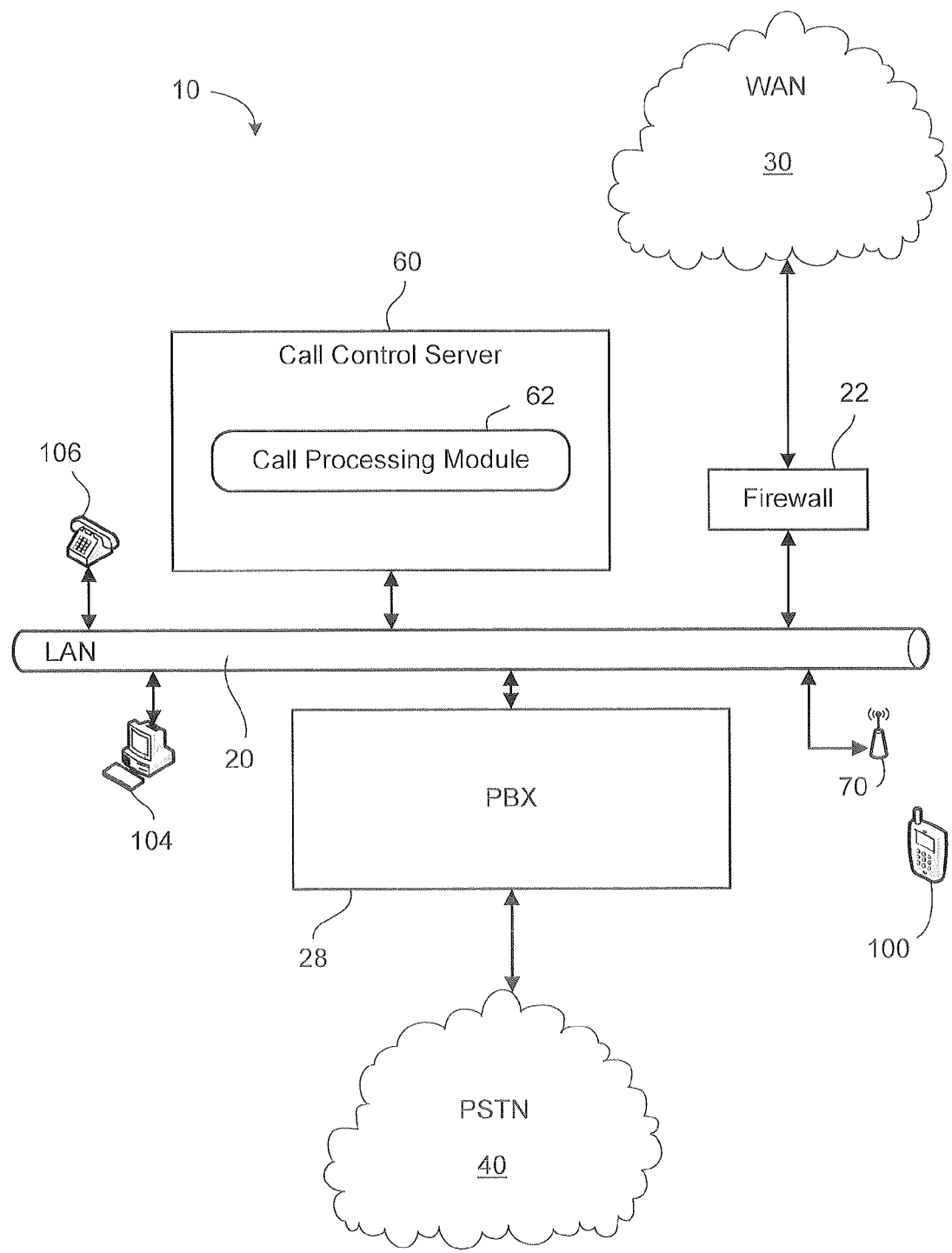
FIG. 2 shows, in block diagram form, another example embodiment of the enterprise communications system.

Reference is now made to FIG. 2, which shows, in block diagram form, another example embodiment of the enterprise communications system 10.

The call control server 60 includes a call processing module 62. The call processing module 62 allows the call control server 60 to send and receive call set-up or management messages to and from the mobile device 100 and/or the PBX 28. The call processing module 62 may be configured to send and receive messages via an IP connection with the mobile device 100 through the access point 70, if such a connection is available, or through a WAN connection if the WLAN connection is not available.

In particular, the call processing module 62 sends and receives SIP messages. In some instances, the call processing module 62 may be configured to cause the call control server 60 to act as a back-to-back user agent (B2BUA) between the PBX 28 and the terminal devices, such as mobile device 100, etc. As will be described below, in some embodiments, the call processing module 62 configures the call control server 60 to perform operations to facilitate handoff of a call from the VoIP interface of the dual-mobile device 100 to the cellular interface of the dual-mode mobile device 100.

It will be appreciated that the call processing module 62 may be implemented mainly by way of suitably programmed software components executed by one or more processors within the enterprise communications server 80.

Using the system 10, the dual-mode device 100 may set up a VoIP call with a remote party 120 (shown individually as 120a, 120b). The remote party 120 may be external to the enterprise, i.e. reachable through the PSTN and, possibly, other networks, as shown by remote terminal 120a. In other circumstances, the remote party 120 may be within the enterprise, as shown by remote party 120b. Remote party 120b may be an IP phone, implemented as a desktop terminal, softphone, or mobile WLAN device similar to the dual-mode device 100, a traditional circuit switched phone or a cellular device.

Figure 3:
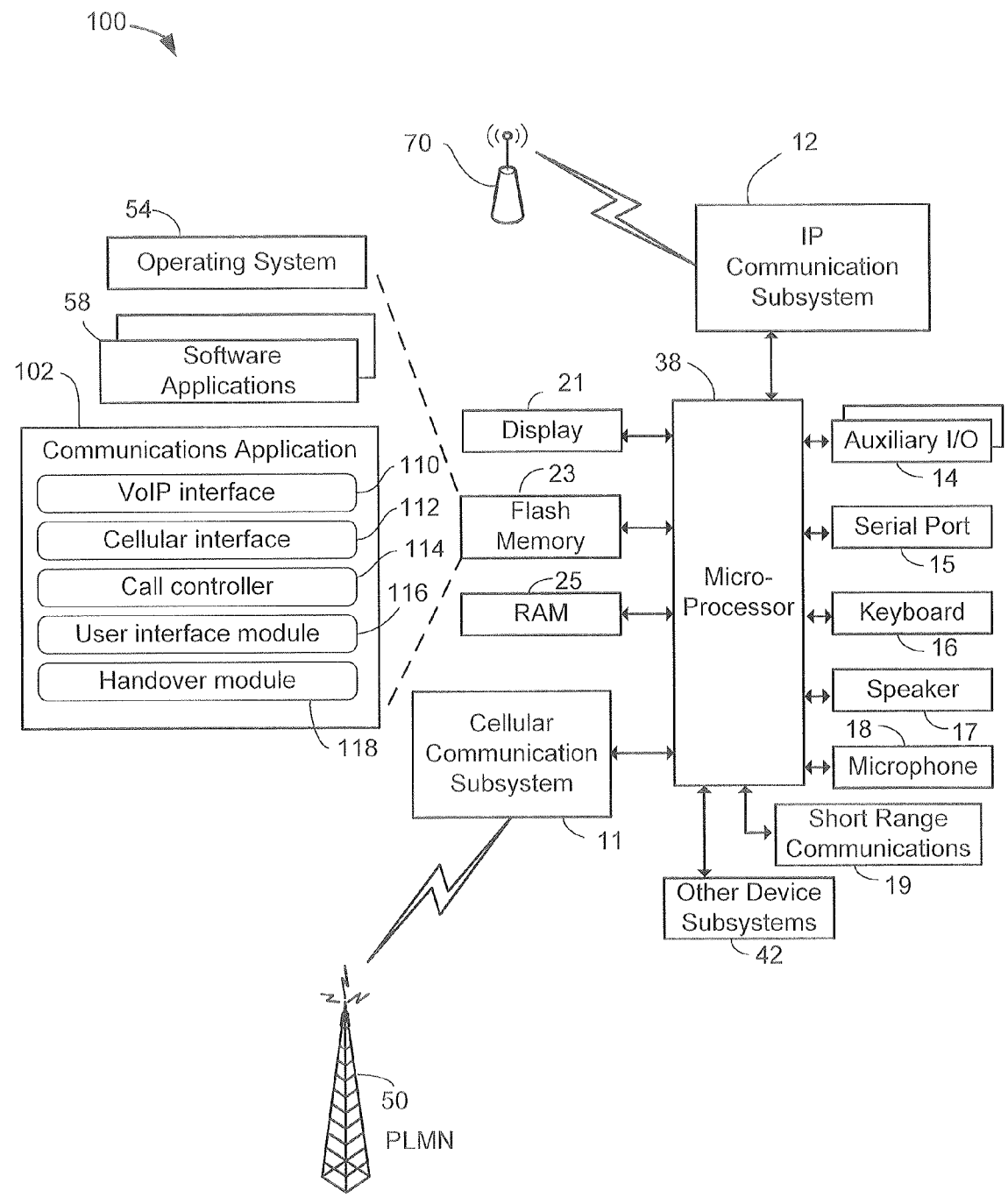
FIG. 3 shows a block diagram of an example embodiment of a dual-mode mobile device.

Reference is now made to FIG. 3, which shows a block diagram of an example embodiment of a dual-mode mobile device 100. In some embodiments, the dual-mode device 100 is a two-way, electronic communications device having data and voice communication capabilities. In at least one example embodiment, the dual-mode device 100 has the capability to exchange messages with other devices and computer systems.

The dual-mode device 100 includes a cellular communication subsystem 11. In one embodiment, the communication subsystem 11 may include a receiver, a transmitter, and associated components such as one or more antenna elements, and a processing module such as a digital signal processor (DSP). As will be apparent to those skilled in the field of communications, the particular design of the cellular communication subsystem 11 will be dependent upon the cellular communication network(s) in which the device 100 is intended to operate.

Signals received by the device 100 from a cellular communication network, such as PLMN 50, are input to the receiver of the cellular communication subsystem 11, which may perform such common receiver functions as signal amplification, frequency down-conversion, filtering, channel selection and the like. In a similar manner, signals to be transmitted are processed, including modulation and encoding for example, by the DSP and input to the transmitter for digitalto-analog conversion, frequency up-conversion, filtering, amplification and transmission over the PLMN 50.

The device 100 also includes an IP communications subsystem 12. The IP communications subsystem 12 facilitates IP connectivity with an IP network for exchanging IP communications. In one embodiment, the IP communications subsystem 12 may include a network card for connecting the device 100 to an Ethernet network, or other IP network. In another embodiment, the IP communications subsystem 12 may include a WiFI card, and associated circuitry, including a suitable antenna and radio transceiver, for achieving wireless connectivity with the WLAN access point 70.

The dual-mode device 100 includes a microprocessor 38 that controls the overall operation of the device. The microprocessor 38 interacts with the cellular communications subsystem 11 and IP communications subsystem 12, and also interacts with further device subsystems such as flash memory 23, random access memory (RAM) 25, auxiliary input/output (I/O) subsystems 14, serial port 15, keyboard or keypad 16, speaker 17, microphone 18, a short-range communications subsystem 19, and any other device subsystems generally designated as 42.

Operating system software 52 and various software applications 54 executed by the microprocessor 38 are, in one example embodiment, stored in a persistent store such as flash memory 23 or similar storage element. Those skilled in the art will appreciate that the operating system 52, software applications 54, or parts thereof, may be temporarily loaded into a volatile store such as RAM 25.

The microprocessor 38, in addition to its operating system functions, enables execution of software applications 54 on the device 100. A predetermined set of software applications 54 which control basic device operations, including data and voice communication applications for example, will normally be installed on the dual-mode device 100 during manufacture. Further software applications 54 may also be loaded onto the device 100 through the PLMN 50, the IP communications subsystem 12, an auxiliary I/O subsystem 14, serial port 15, short-range communications subsystem 19, or any other suitable subsystem 42, and installed by a user in the flash memory 23, the RAM 25 or a non-volatile store for execution by the microprocessor 38.

Included among the software applications 54 on the device 100 is the communications application 102. Although the communications application 102 is depicted as discreet software for the purposes of this description, it may be incorporated into other software, including the operating system 54. In some embodiments, the communications application 102 may be two or more separate software applications.

The communications application 102 includes a VoIP interface 110 and a cellular interface 112. The VoIP interface 110 represents the software modules and components for sending and receiving IP communications via the IP communications subsystem 12. In particular, the VoIP interface 110 includes the software modules and components for facilitating a voice call. For example, the VoIP interface 110 may manage the receipt and sending of RTP packets over UDP. In one embodiment, the VoIP interface 110 is configured to employ SIP communications for setting up, managing, and tearing down sessions for voice calls.

The cellular interface 112 represents the software modules and components for sending and receiving voice communications via the cellular communication subsystem 11. In particular, the cellular interface 112 includes the software modules and components for managing the receipt and sending of audio communications conforming to one or more cellular protocols, such as, for example, GSM. The cellular interface 112 may perform encoding and decoding of audio media, and may engage in signaling with the PLMN 50 to set-up, manage, and tear down voice calls.

It will be appreciated that aspects of the VoIP interface 110 and/or the cellular interface 112 may be implemented within the IP communication subsystem 12 and cellular communication subsystem 11, respectively. In particular, while in many embodiments the VoIP interface may be realized over a WiFi connection, it is possible that in some embodiments the VoIP interface could be implemented over a cellular channel. References to the VoIP interface are not intended to be limited to a WiFi connection and should be understood as including any connectivity over which an IP connection may be established, including IEEE 802.16 (WiMax), cellular, and others.

The communications application 102 may include a user interface module 116 for interacting with the user to present call information on the display 21 and to receive user input via the keyboard 16 or other auxiliary I/O 14 to initiate, manage, or terminate voice calls.

The communications application 102 may also include a call controller 114 configured to control the VoIP interface 110, the cellular interface 112, and the user interface module 116. For example, in one embodiment, the call controller 114 determines whether a requested call should be initiated using the VoIP interface 110 or the cellular interface 112. In another embodiment, the call controller 114 determines whether to switch an active VoIP call from the VoIP interface 110 to the cellular interface 112, as will be described below. The decision to switch from VoIP to cellular may be automated, in that the call controller 114 determines whether to switch a call based on various measurements, characteristics or parameters accordingly to a predetermined rule set. The decision may also or alternatively be based on a user input indicating that the user wished to switch the VoIP call to cellular.

The communications application 102 may further include a handoff module 118 for managing the handoff of an active VoIP call to the cellular interface 112. It will be appreciated that the handoff module 118, although depicted discreetly, may form a part of the call controller 114. The handoff module 118 may manage the process of initiating a handoff operation, including answering an incoming cellular call at the cellular interface 112, as will be described below.

Figure 4:
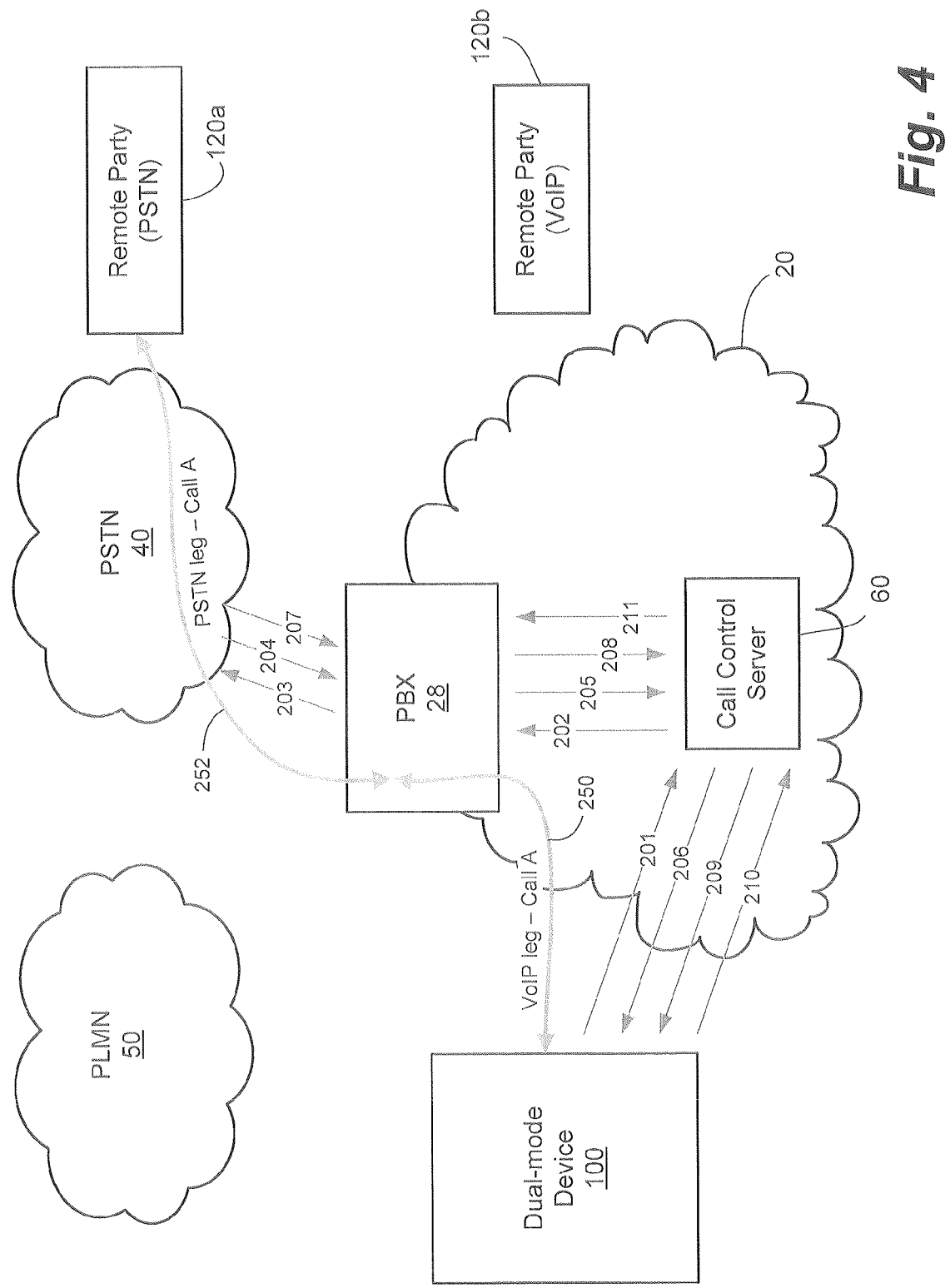
FIG. 4 diagrammatically illustrates an example of the call flow for establishing an active call from the dual-mode device to a remote party external to the enterprise.

Reference is now made to FIG. 4, which diagrammatically illustrates an example of the call flow for establishing an active call from the dual-mode device 100 to a remote party 120*a* external to the enterprise.

The dual-mode device 100, in this example, initiates the call by sending a SIP INVITE message 201 to the call control server 60. The dual-mode device 100 is configured to recognize the call control server 60 as its SIP server. The PBX 28 acts as a SIP registrar containing the bindings between SIP URIs and one or more contact addresses, such as, for example IP addresses, PSTN telephone numbers, etc. The SIP INVITE 201 contains the SIP URI or telephone number of the remote party 120*a*.

The call control server 60 receives the SIP INVITE message 201 and forwards it as SIP INVITE message 202 to the PBX 28, which then issues an offering message 203 to the PSTN 40 addressed to the remote party 120*a*. The offering message 203 and other signaling between the PSTN 40 and the PBX 28 may conform to a suitable signaling protocol, for example ISDN signaling. The PSTN 40 may return an alerting message 204 confirming that the remote party 120*a* has been reached and notified of the offered call. The PBX 28 may then return a SIP 180 RINGING message 205 to the call control server 60, which may then send a SIP 180 RINGING message 206 to the dual-mode device 100.

If the remote party 120*a* answers the incoming call, the PSTN 40 sends the PBX 28 an accepted message 207. The PBX 28 then sends a SIP 200 OK message 208 to the call control server 60, which sends a SIP 200 OK message 209 to the dual-mode device 100. The device 100 responds with an ACK message 210, which the call control server 60 relays to the PBX 28.

On completion of the SIP signaling the two-way media path for the call is established. The call includes a VoIP leg 250 between the dual-mode device 100 and the PBX 28. Accordingly, the VoIP leg 250 is terminated at the dual-mode device 100 VoIP interface and at the PBX 28. The call also includes a PSTN leg 252 between the PBX 28 and the remote party 120*a*. The PBX 28 terminates the PSTN leg 252 as well. The PSTN leg 252 and the VoIP leg 250 media paths are bridged or joined at the PBX 28.

The PBX 28 and call control server 60 may take steps to ensure that they both remain in the call path for all SIP signaling.

All of the SIP messaging shown in FIG. 4 occurs in the context of a single dialog, referred to herein as a first dialog or Dialog A.

Figure 5:
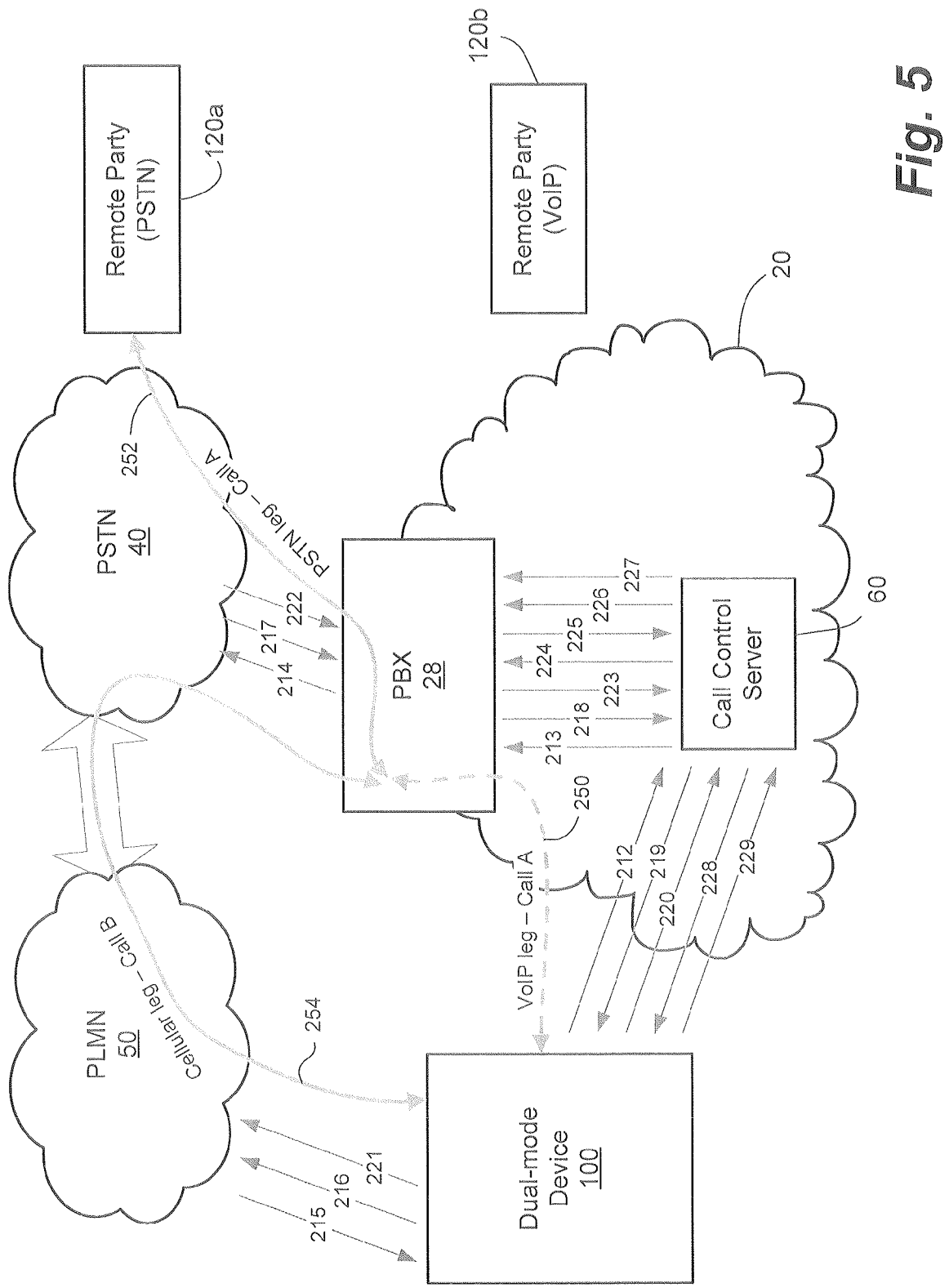
FIG. 5 shows example call flows for handing off the active call of FIG. 4 from the VoIP interface of the dual-mode device to the cellular interface.

Reference is now made to FIG. 5, which shows example call flows for handing off the active call from the VoIP interface of the dual-mode device to the cellular interface.

The decision to handoff the active VoIP call to the cellular interface of the dual-mode device 100 may be made manually or automatically. In one example embodiment, the user of the dual-mode device 100 manually selects a "handoff" option for triggering the handoff. This may occur if the user is aware that he or she is roaming out of a WLAN coverage area, such as an enterprise facility or campus, and wishes to switch the active call over the cellular interface. In this example embodiment, the communications application may provide a "handoff" option on the user interface, such as menu option, which the user can select during an active VoIP call.

In another example embodiment, the handoff decision may be made automatically by the dual-mode device 100. The decision may be made based on any of a number of factors. For example, the device 100 may determine that it is leaving the WLAN coverage area and may, therefore, decide to switch an active VoIP call to the cellular interface. The device 100 may determine that it is leaving the coverage area in any of a number of ways, including signal strength detection, triangulation and coverage map correlation, border access point recognition, or other mechanisms. The precise mechanism for triggering the handoff decision on the dual-mode device 100, be it manual or automatic, is not germane to the present application and it will be appreciated that any suitable mechanism may be used.

The handoff is initiated by the device 100 by sending a SIP re-INVITE message 212 to the call control server 60. The re-INVITE message 212 occurs within the existing Dialog A for the active VoIP call. It includes an indicator in an extension to the SIP format that the call control server 60 is configured to recognize as a VoIP-to-cellular handoff instruction. The handoff operation or process may be a feature or application offered by the call control server 60 and selectable by the dual-mode device 60 using the handoff indicator. Example embodiments of an extension to the SIP format for permitting SIP clients to select service features from SIP servers are described in U.S. patent application Ser. No. 11/691,861, filed Mar. 27, 2007, the contents of which are incorporated herein by reference.

The re-INVITE message 212 also includes the cellular number for the cellular interface of the dual-mode device 100, or at least a SIP URI or other indicator that may be resolved to the cellular number by the call control server 60 and/or the PBX 28. The call control server 60 receives the re-INVITE message 212 and, consequently, sends a new SIP INVITE message 213 to the PBX 28 addressed to the cellular number (or SIP URI for the cellular identity of the dual-mode device 100). The new SIP INVITE message 213 constitutes a new dialog, referred to herein as a second dialog or Dialog B. The SIP INVITE message 213 sent by the call control server 60 does not contain any Session Description Protocol (SDP) information. In other words, it does not contain an offer.

On receipt of the SIP INVITE message 213, the PBX 28 initiates a cellular call to the dual-mode device 100, as indicated by offered messages 214 and 215. In response, it receives an alerting message 216 and 217, and sends the call control server 60 a SIP 180 RINGING message 218. The call control server 60, on receiving confirmation that the cellular call is ringing through to the dual-mode device 100, sends the dual-mode device 100 a 200 OK message 219 within Dialog A, which confirms for the device 100 that the cellular call at the cellular interface is the one initiated by the call control server 60 for the handoff.

As noted above, the dual-mode device 100 receives an incoming cellular call at its cellular interface. This incoming call may be the call placed by the VoIP interface of the device 100; however, circumstances may arise where the call is from a third party placing an ordinary cellular call to the dual-mode device 100 that arrives just prior to the call from the VoIP interface. In those circumstances, the dual-mode device 100 risks answering the wrong call in the context of the handoff procedure. Accordingly, the dual-model device 100 requires a mechanism for determining whether the incoming call signal received originates from the call control server 60 in connection with the handoff.

In one embodiment, the dual-mode device 100 may be configured to determine whether the incoming call is from its VoIP interface based on caller identification information in the received incoming offered message 215. The device 100 may compare the caller identification information with its own VoIP identity information to determine whether the incoming call is the correct one. In some embodiments, this may suffice; however, in some cases the caller identification information may be inadequate. First, many dual-mode device 100 users may not subscribe to the caller identification (CID) service from the PLMN operator. In many instances, the CID service is optional and is not always available. Second, in many embodiments, the VoIP interface of the dual-mode device 100 may correspond to a user enterprise extension number. Many CID services do not necessarily pass on extension information, meaning that the CID information in the incoming offered signal 215 may only reflect the general PBX/enterprise number, and not the user VoIP extension. In this case, the device 100 cannot distinguish from its own incoming call and an incoming cellular call from another enterprise user.

Accordingly, before answering an incoming cellular call while in a "awaiting handoff" state, the device 100 awaits receipt of the 200 OK message 219 from the call control server 60 confirming that the cellular call offered is for the handoff. If another caller is attempting to connect to the device 100 through the PLMN 50, the PBX 28 would have received a busy indication instead of the alerting signal 217.

It will be appreciated that, in the "awaiting handover" state the communications application of the device 100 does not present the incoming call to the user interface, e.g. by ringtone, etc. The user is unaware of the incoming cellular call. The device 100 answers the call with an accepted message 206. The PBX 28 receives an accepted message 207 via the PSTN 40, confirming that a cellular call leg 254 is established from the cellular interface of the device 100 to the PBX 28.

The PBX 28 then sends a 200 OK message 223 within Dialog B to the call control server 60 confirming that the cellular call has been completed and, therefore, accepting the SIP INVITE message 213. Because the SIP INVITE message 213 did not contain any SDP information, the 200 OK message 223 from the PBX 28 contains SDP information for the cellular call leg 254.

The call control server 60 then initiates a re-invite process with the termination point of the VoIP leg 250 of the initial call, i.e. the call being handed off. In this example, the VoIP leg 250 is terminated on the PBX 28, so the call control server 60 sends a SIP re-INVITE message 224 within Dialog A to the PBX 28. The SIP re-INVITE message 224 contains the SDP for the cellular call leg 254 extracted from the 200 OK message 223. The purpose of this re-INVITE message 224 is to have the termination point for the VoIP leg 250 being shuffled begin to direct media to the cellular call leg 254. The PBX 28 responds with a 200 OK message 225 and the call control server 60 sends an ACK message 226. Thereafter, media from the remote party 120b is routed from the PSTN leg 252 to the cellular call leg 254.

The call control server 60 then sends an ACK message 227 on Dialog B in response to the 200 OK message 223. The ACK message 227 includes the SDP information for the PSTN call leg 252 from Dialog A. The PBX 28 now directs media received over the cellular call leg 254 to the PSTN call leg 252 and, thus, to the remote party 120a. The transfer of the call is now effective.

The call control server 60 then sends a BYE message 228 to the VoIP interface of the dual-mode device 100 regarding Dialog A, and receives a 200 OK message 229, which effectively tears down the VoIP leg 250. The device 100 swaps the audio path from the VoIP connection to the cellular connection on reception of the BYE message 228.

Figure 6:
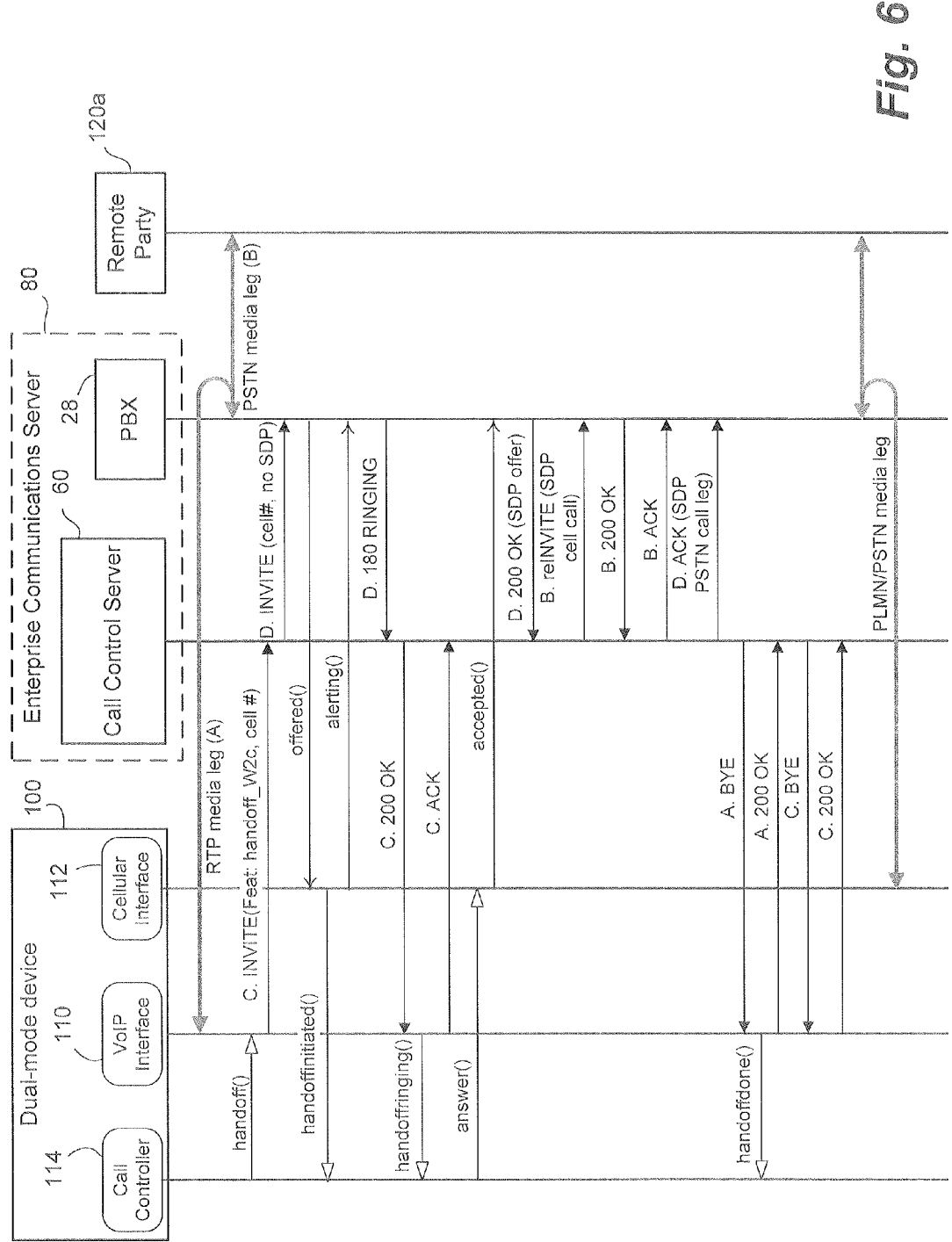
FIG. 6 illustrates the call flows of FIG. 5 in a different format.

Reference may be made to FIG. 6 in conjunction with FIG. 5. FIG. 6 illustrates the call flows of FIG. 5 in a different format. In FIG. 6, the internal API calls between the VoIP interface 110, the cellular interface 112, and the call controller 114 within the dual-mode device 100 are also illustrated in the context of the call flow.

Figure 9:
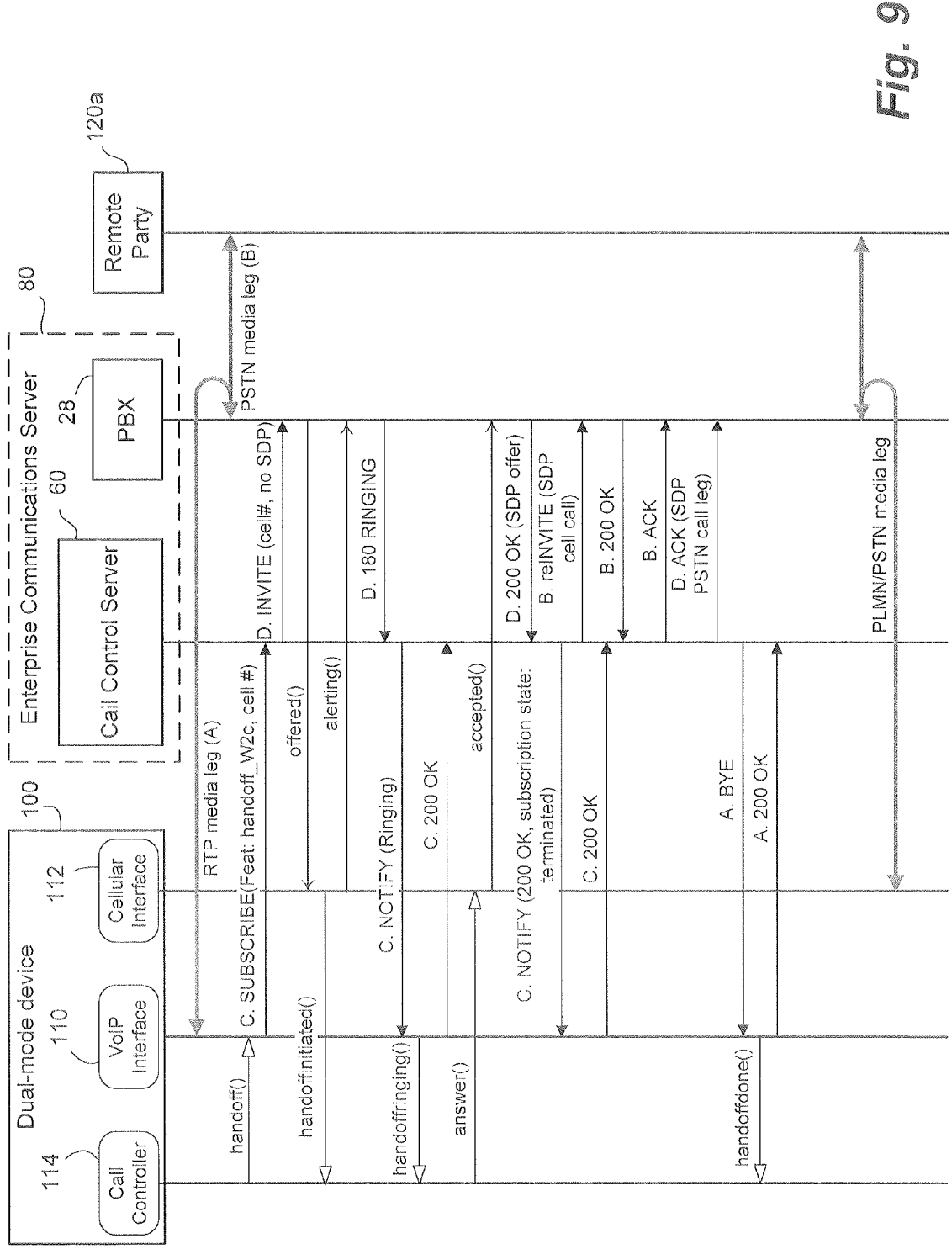
FIG. 9 shows another embodiment of the call flows from FIG. 6.

Reference is also made to FIG. 9, which shows another embodiment of the call flows shown in FIGS. 5 and 6. In this embodiment, instead of the dual-mode device 100 sending a SIP INVITE message to the call control server 60 with a handoff indicator, the dual-mode device 100 employs the SIP SUBSCRIBE feature The SUBSCRIBE message includes the handoff indicator that the call control server 60 is configured to recognize. The call control server 60 responds with a 200 OK message and, later, notifies the dual-mode device 100 that the cellular call is ringing on the device's cellular interface by sending a NOTIFY message confirming that the call is ringing through. Subsequent to the cellular call being accepted, the subscription is cancelled with further NOTIFY message to which the device 100 responds with a 200 OK. In yet another embodiment, a NOTIFY (200 OK) message may be used in place of the NOTIFY (Ringing) message. Other variations will be appreciated by those skilled in the art.

Figure 7:
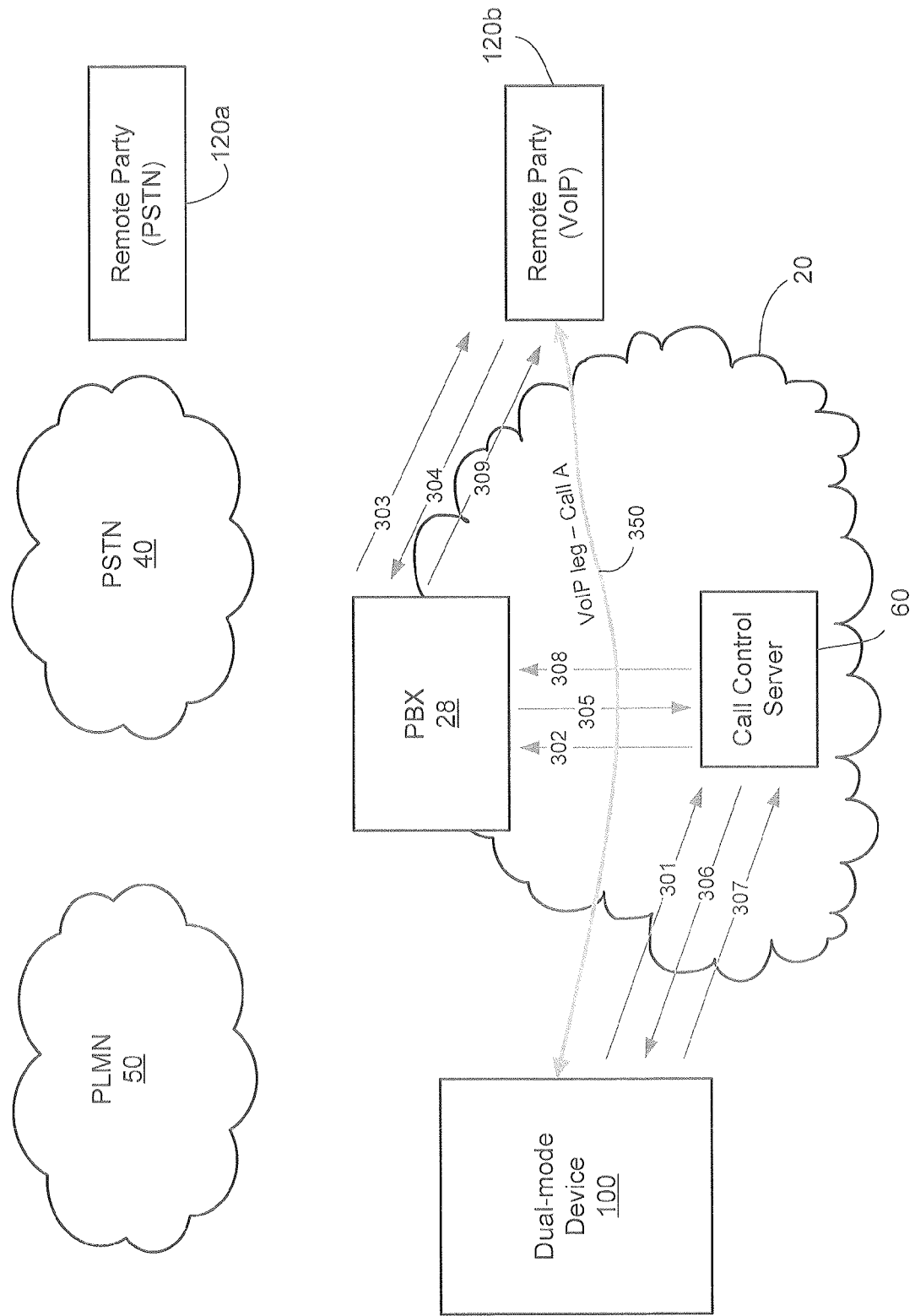
FIG. 7 illustrates an example of call flow for establishing a call from the dual-mode device to a remote party internal to the enterprise.

Reference is now made to FIG. 7, which illustrates an example of call flow for establishing a call from the dual-mode device 100 to a remote party 120b internal to the enterprise, i.e. connected to the LAN 20 and capable of VoIP communications.

The dual-mode device 100, in this example, initiates the call by sending a SIP INVITE message 301 to the call control server 60. As in the previous example, the dual-mode device 100 is configured to recognize the call control server 60 as its SIP proxy server. The SIP INVITE 301 contains the SIP URI, telephone extension number, or other contact identifier, of the remote party 120b.

The call control server 60 receives the SIP INVITE message 301 and forwards it as SIP INVITE message 302 to the PBX 28. The PBX 28 determines the address of the remote party 120b and sends a SIP INVITE message 303 to the remote party 120b. The remote party 120b returns a 200 OK message 304 confirming that he or she is accepting the call. The PBX 28 sends a 200 OK message 305 to the call control server 60, which sends a 200 OK message 306 to the dual-mode device 100. The dual-mode device 100 then sends an ACK message 307, 308, 309, to complete set-up of the VoIP leg 350 with the remote party 120b. Accordingly, the VoIP leg 350 is terminated at the dual-mode device 100 VoIP interface and at the remote party 120b.

It will be noted that some signaling, such as ringing messages, has been omitted for clarity.

The PBX 28 and call control server 60 may take steps to ensure that they both remain in the call path for all SIP signaling.

All of the SIP messaging shown in FIG. 7 occurs in the context of a single dialog, referred to herein as a first dialog or Dialog A.

Figure 8:
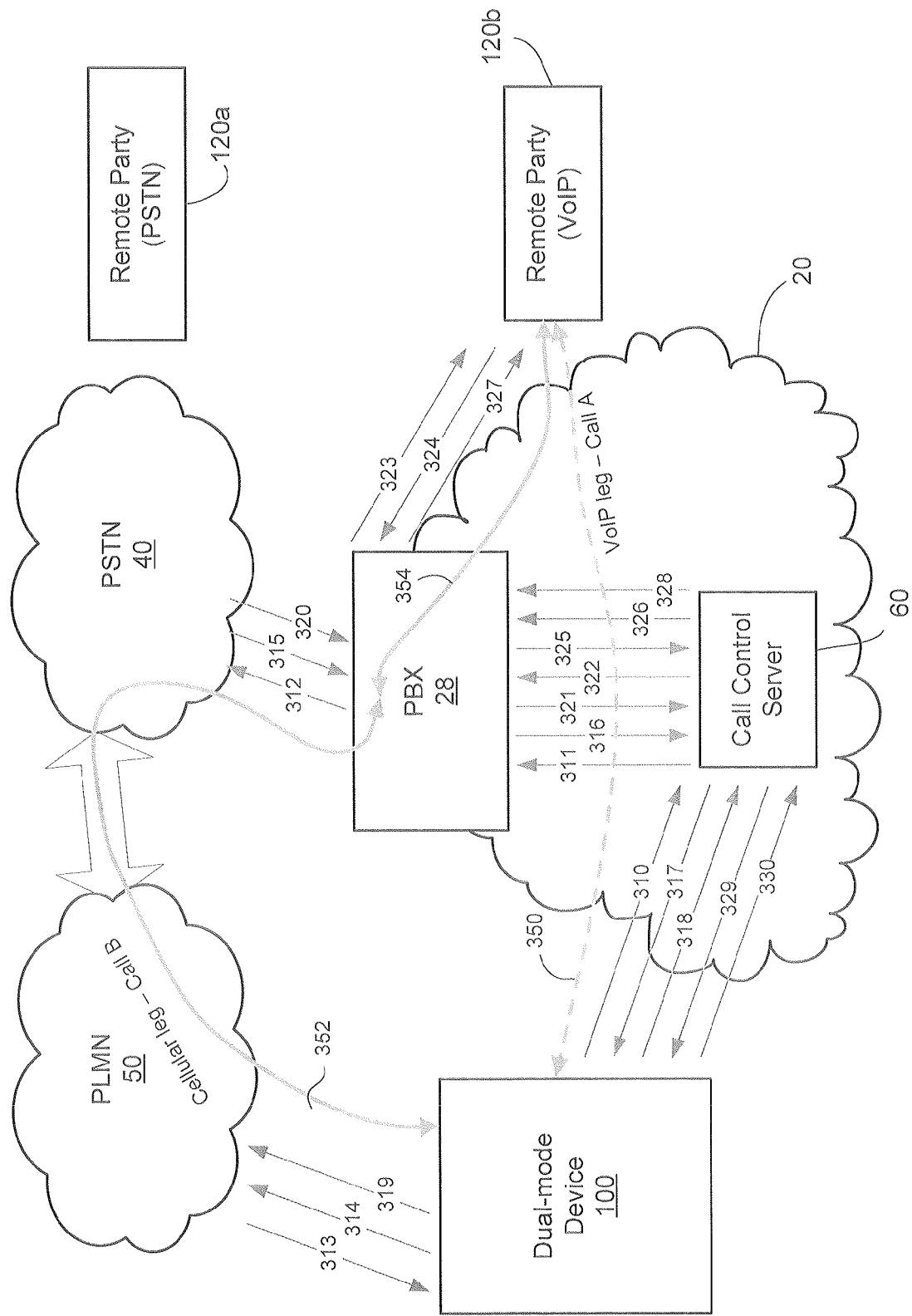
FIG. 8 shows example call flows for handing off the active call of FIG. 7 from the VoIP interface of the dual-mode device to the cellular interface.

Reference is now made to FIG. 8, which shows example call flows for handing off the active call from the VoIP interface of the dual-mode device to the cellular interface. As with the example discussed above in connection with FIGS. 4-6, the decision to handoff the active VoIP call to the cellular interface of the dual-mode device 100 may be made manually or automatically.

The handoff is initiated by the device 100 by sending a SIP re-INVITE message 310 to the call control server 60. The re-INVITE message 310 occurs within the existing Dialog A for the active VoIP call. As described in the previous example, the SIP re-INVITE message 310 includes an indicator in an extension to the SIP format that the call control server 60 is configured to recognize as a VoIP-to-cellular handoff instruction. The re-INVITE message 310 also includes the cellular number for the cellular interface of the dual-mode device 100, or at least a SIP URI or other indicator that may be resolved to the cellular number by the call control server 60 and/or the PBX 28.

The call control server 60 receives the re-INVITE message 310 and, consequently, sends a new SIP INVITE message 311 to the PBX 28 addressed to the cellular number (or SIP URI for the cellular identity of the dual-mode device 100). The new SIP INVITE message 311 constitutes a new dialog, referred to herein as a second dialog or Dialog B. The SIP INVITE message 311 sent by the call control server 60 does not contain any Session Description Protocol (SDP) information. In other words, it does not contain an offer.

On receipt of the SIP INVITE message 311, the PBX 28 initiates a cellular call to the dual-mode device 100, as indicated by offered messages 312 and 313. In response, it receives an alerting message 314 and 315, and sends the call control server 60 a SIP 180 RINGING message 316. The call control server 60, on receiving confirmation that the cellular call is ringing through to the dual-mode device 100, sends the dual-mode device 100 a 200 OK message 317 within Dialog A, which confirms for the device 100 that the cellular call at the cellular interface is the one initiated by the call control server 60 for the handoff. The device 100 answers the call with an accepted message 319. The PBX 28 receives an accepted message 320 via the PSTN 40, confirming that a cellular call leg 352 is established from the cellular interface of the device 100 to the PBX 28.

The PBX 28 then sends a 200 OK message 321 within Dialog B to the call control server 60 confirming that the cellular call has been completed and, therefore, accepting the SIP INVITE message 311. Because the SIP INVITE message 311 did not contain any SDP information, the 200 OK message 321 from the PBX 28 contains SDP information for the cellular call leg 352.

The call control server 60 then initiates a re-invite process with the termination point of the VoIP leg 350 of the initial call, i.e. the call being handed off. In this example, the VoIP leg 350 is terminated at the remote party 120b, so the call control server 60 sends a SIP re-INVITE message 322 within Dialog A to the PBX 28, which then sends the SIP re-INVITE message 323 to the remote party 120b, in accordance with the SIP signaling path for Dialog A.

The SIP re-INVITE messages 322, 323 contain the SDP for the cellular call leg 352 extracted from the 200 OK message 321. The purpose of the re-INVITE messages 322, 323 is to have the remote party 120b begin to direct media to PBX 28 and, in particular, the cellular call leg 352. The remote party 120b responds to the re-INVITE message 323 with a 200 OK message 324, which the PBX 28 relays to the call control server 60 as 200 OK message 325. The call control server 60 then sends an ACK message 326, which the PBX 28 relays to the remote party 120b as ACK message 327. Thereafter, media from the remote party 120b is sent to the PBX 28 over new VoIP leg 354 and directed to the cellular call leg 352.

The call control server 60 then sends an ACK message 328 on Dialog B in response to the 200 OK message 321. The ACK message 328 includes the SDP information for the new VoIP call leg 354 from Dialog A. The PBX 28 now directs media received over the cellular call leg 352 to the new VoIP call leg 354 and, thus, to the remote party 120b. The transfer of the call is now effective.

The call control server 60 then sends a BYE message 329 to the VoIP interface of the dual-mode device 100 regarding Dialog A, and receives a 200 OK message 330, which effectively tears down the VoIP leg 250.

Certain adaptations and modifications of the described embodiments can be made. Therefore, the above discussed embodiments are considered to be illustrative and not restrictive.

What is claimed is:

1. A method of handing off an active call at a Voice-over-IP (VoIP) interface of a client dual-mode device to a cellular interface of the dual-mode device, the active call including a VoIP leg from the dual-mode device to a first termination point, the first termination point including a private branch exchange (PBX), the method comprising:
   receiving, at a communications server via an Internet Protocol (IP) IP network, a handoff message from the VoIP interface of the dual-mode device, wherein said handoff message comprises a custom session initiation protocol (SIP) message containing a handoff feature indicator and containing a cellular interface number for the dual-mode device and a call identifier regarding the active call;
   initiating a cellular call, via the PBX over a public land mobile network (PLMN), from the communications server to the cellular interface of the dual-mode device;
   receiving, at the communications server, a ringing message from the PBX;
   sending in response to receiving the custom SIP message, while the cellular interface of the dual-mode device is ringing, an SIP 200 OK message from the communications server via the IP network to the dual-mode device confirming that the ringing of the initiated cellular call for the dual-mode device is for handoff of the active call from the VoIP interface to the cellular interface, the dual-mode device responsive to the SIP 200 OK message by automatically accepting the initiated cellular call in response to receiving the SIP 200 OK message and not accepting any other cellular calls;
   receiving an accept message via the PLMN with regard to the initiated cellular call, the accept message confirming connection of the cellular call with the cellular interface of the dual-mode device; and,
   terminating the VoIP leg.

2. The method claimed in claim 1, wherein the active call is established in a first dialog, and wherein the sending the message to the first termination point comprises sending a SIP re-INVITE message to the first termination point in association with the first dialog, the SIP re-INVITE message containing Session Description Protocol (SDP) information for the cellular call.

3. The method claimed in claim 2, wherein the first termination point comprises the PBX having a public switched telephone network (PSTN) gateway, the active call includes a PSTN leg terminated at the PBX, the cellular call is terminated at the PBX, and wherein the re-INVITE message causes the PBX to connect the PSTN leg to the cellular call.

4. The method claimed in claim 2, wherein the first termination point comprises a VoIP-capable device within the IP network, the communications server includes the PBX having an interface to the PLMN, the cellular call is terminated at the PBX, and wherein the re-INVITE message causes the VoIP-capable device to redirect media from the first dialog to the PBX in a new media path, and the PBX connects the new media path to the cellular call.

5. The method claimed in claim 1, wherein the communications server comprises a call control server and the PBX, the PBX having an IP interface to the IP network and a PSTN interface, and wherein the receiving a handoff message comprises receiving the handoff message from the dual-mode device at the call control server, and sending a SIP INVITE message from the call control server to the PBX addressed to the cellular interface of the dual-mode device.

6. The method claimed in claim 5, wherein the SIP INVITE message contains no SDP offer.

7. The method claimed in claim 6, wherein the PBX receives the accept message confirming connection of the cellular call, and wherein the method further includes sending a SIP 200 offer from the PBX to the call control server in response to the SIP INVITE message, wherein the SIP 200 offer contains SDP information for the cellular call.

8. The method claimed in claim 7, wherein the VoIP leg is established in a first dialog, and wherein the sending the message to the first termination point comprises sending a SIP re-INVITE message to the first termination point from the call control server in association with the first dialog, the SIP re-INVITE message containing the SDP information for the cellular call.

9. The method claimed in claim 8, wherein the active call includes a PSTN leg terminated at the PBX and the first termination point comprises the PBX, and wherein the re-INVITE message causes the PBX to connect the PSTN leg to the cellular call.

10. The method claimed in claim 8, wherein the first termination point comprises a VoIP-capable device within the IP network, and wherein the SIP re-INVITE message is sent to the VoIP-capable device via the PBX in accordance with the first dialog, and wherein the SIP re-INVITE message causes the VoIP-capable device to redirect media associated with the first dialog to the PBX in a new media path as specified by the SDP information, and the PBX connects the new media path to the cellular call.

11. The method claimed in claim 8, further including sending a first SIP ACK message from the call control server to the first termination point to complete the re-invite process, and sending a second SIP ACK message from the call control server to the PBX in response to the SIP 200 offer, wherein the second SIP ACK message contains SDP information for the first termination point in connection the first dialog, thereby causing the PBX to route media from the cellular call to a remote party.

12. The method claimed in claim 1, wherein the custom SIP message comprises a custom SIP INVITE message.

13. The method claimed in claim 1, wherein the custom SIP message comprises a custom SIP SUBSCRIBE message.

14. A communications server for managing a handoff of an active call at a Voice-over-IP (VoIP) interface of a client dual-mode device to a cellular interface of the dual-mode device, the active call including a VoIP leg from the dual-mode device to a first termination point, the first termination point including a private branch exchange (PBX), the communications server comprising:
   a call processing module configured to receive, via an Internet Protocol (IP) network, a handoff message from the VoIP interface of the dual-mode device, wherein said handoff message comprises a custom session initiation protocol (SIP) message containing a handoff feature indicator and containing a cellular interface number for the dual-mode device and a call identifier regarding the active call; and
   a PSTN interface configured to initiate a cellular call, via the PBX over a public land mobile network (PLMN), from the communications server to the cellular interface of the dual-mode device,
   wherein the call processing module is configured to receive a ringing message from the PBX and to send in response to receiving the custom SIP message, while the cellular interface of the dual-mode device is ringing, an SIP 200 OK message via the IP network to the dual-mode device confirming that the ringing of the initiated cellular call for the dual-mode device is for handoff of the active call from the VoIP interface to the cellular interface, the dual-mode device responsive to the SIP 200 OK message by automatically accepting the initiated cellular call in response to receiving the SIP 200 OK message and not accepting any other cellular calls, the PSTN interface is configured to receive an accept message via the PLMN with regard to the cellular call, the accept message confirming connection of the cellular call with the cellular interface of the dual-mode device, and the call processing module is further configured to terminate the VoIP leg.

15. The communications server claimed in claim 14, wherein the active call is established in a first dialog, and wherein the call processing module is configured to send a message to the first termination point by sending a SIP re-INVITE message to the first termination point in association with the first dialog, the SIP re-INVITE message containing Session Description Protocol (SDP) information for the cellular call.

16. The communications server claimed in claim 15, wherein communication server comprises the PBX containing the PSTN interface and a call control server containing the call processing module, the PBX and call control server being connected by the IP network, and wherein the first termination point comprises the PBX, the active call includes a PSTN leg terminated at the PBX, the cellular call is terminated at the PBX, and wherein the PBX is configured to connect the PSTN leg to the cellular call based on the re-INVITE message.

17. The communications server claimed in claim 15, wherein the first termination point comprises a VoIP-capable device within the IP network, the communications server includes the PBX containing the PSTN interface and a call control server containing the call processing module, the PBX and call control server being connected by the IP network, and wherein the cellular call is terminated at the PBX, and wherein the VoIP-capable device is configured to redirect media from the first dialog to the PBX in a new media path based on the re-INVITE message, and the PBX is configured to connect the new media path to the cellular call.

18. The communications server claimed in claim 14, wherein the communications server includes the PBX containing the PSTN interface and a call control server containing the call processing module, the PBX and call control server being connected by the IP network, and wherein the call processing module in the call control server is configured to send a SIP INVITE message from the call control server to the PBX addressed to the cellular interface of the dual-mode device based on the handoff message, and wherein the PBX is configured to initiate the cellular call in response to the SIP INVITE message.

19. The communications server claimed in claim 18, wherein the SIP INVITE message contains no SDP offer.

20. The communications server claimed in claim 19, wherein the PBX is configured to receive an accept message confirming connection of the cellular call, and, consequent thereon, to send a SIP 200 offer to the call control server in response to the SIP INVITE message, wherein the SIP 200 offer contains SDP information for the cellular call.

21. The communications server claimed in claim 20, wherein the VoIP leg is established in a first dialog, and wherein the call processing module is configured to send a message to the first termination point by sending a SIP re-INVITE message to the first termination point in association with the first dialog, the SIP re-INVITE message containing Session Description Protocol (SDP) information for the cellular call.

22. The communications server claimed in claim 21, wherein the active call includes a PSTN leg terminated at the PBX and the first termination point comprises the PBX, the cellular call is terminated at the PBX, and wherein the PBX is configured to connect the PSTN leg to the cellular call based on the re-INVITE message.

23. The communications server claimed in claim 21, wherein the first termination point comprises a VoIP-capable device within the IP network, the cellular call is terminated at the PBX, and wherein the call control module is configured to send the SIP re-INVITE message to the PBX and the PBX is configured to relay the SIP re-INVITE message to the VoIP-capable device in accordance with the first dialog, and the VoIP-capable device is configured to redirect media associated with the first dialog to the PBX in a new media path as specified by the SDP information based on the SIP re-INVITE message, and the PBX is configured to connect the new media path to the cellular call.

24. The communications server claimed in claim 21, wherein the call control server is configured to send a first SIP ACK message to the first termination point to complete the re-invite process, and to send a second SIP ACK message to the PBX in response to the SIP 200 offer, wherein the second SIP ACK message contains SDP information for the first termination point in connection the first dialog, thereby causing the PBX to route media from the cellular call to a remote party.

25. The communications server claimed in claim 14, wherein the custom SIP message comprises a custom SIP INVITE message.

26. The communications server claimed in claim 14, wherein the custom SIP message comprises a custom SIP SUBSCRIBE message.

27. A computer program product comprising a non-transitory machine-readable medium having encoded thereon computer-executable instructions for handing off an active call at a Voice-over-IP (VoIP) interface of a client dual-mode device to a cellular interface of the dual-mode device, the active call including a VoIP leg from the dual-mode device to a first termination point, the first termination point including a private branch exchange (PBX), the computer-executable instructions comprising:

instructions for receiving, at a communications server via an Internet Protocol (IP) network, a handoff message from the VoIP interface of the dual-mode device, wherein said handoff message comprises a custom session initiation protocol (SIP) message containing a handoff feature indicator and containing a cellular interface number for the dual-mode device and a call identifier regarding the active call;

instructions for initiating a cellular call, via the PBX over a public land mobile network (PLMN), from the communications server to the cellular interface of the dual-mode device;

instructions for receiving, at the communications server, a ringing message from the PBX;

instructions for sending in response to receiving the custom SIP message, while the cellular interface of the dual-mode device is ringing, an SIP 200 OK message from the communications server via the IP network to the dual-mode device confirming that the ringing of the initiated cellular call for the dual-mode device is for handoff of the active call from the VoIP interface to the cellular interface, the dual-mode device responsive to the SIP 200 OK message by automatically accepting the initiated cellular call in response to receiving the SIP 200 OK message and not accepting any other cellular calls;

instructions for receiving an accept message via the PLMN with regard to the initiated cellular call, the accept message confirming connection of the cellular call with the cellular interface of the dual-mode device; and, instructions for terminating the VoIP leg.

\* \* \* \* \*